(12) United States Patent
Thoreau et al.

(10) Patent No.: US 11,202,097 B2
(45) Date of Patent: Dec. 14, 2021

(54) METHOD AND APPARATUS FOR ENCODING AND DECODING AT LEAST ONE BLOCK OF A PICTURE BASED ON COMPONENTS OF THE AT LEAST ONE BLOCK

(71) Applicant: INTERDIGITAL VC HOLDINGS, INC., Wilmington, DE (US)

(72) Inventors: Dominique Thoreau, Cesson-Sevigne (FR); Mehmet Turkan, Cesson-Sevigne (FR); Martin Alain, Cesson-Sevigne (FR); Joaquin Zepeda Salvatierra, Cesson-Sevigne (FR)

(73) Assignee: INTERDIGITAL MADISON PATENT HOLDINGS, SAS, Paris (FR)

( * ) Notice: Subject to any disclaimer, the term of this patent is extended or adjusted under 35 U.S.C. 154(b) by 108 days.

(21) Appl. No.: 16/339,407

(22) PCT Filed: Oct. 24, 2017

(86) PCT No.: PCT/EP2017/077140
§ 371 (c)(1),
(2) Date: Apr. 4, 2019

(87) PCT Pub. No.: WO2018/077865
PCT Pub. Date: May 3, 2018

(65) Prior Publication Data
US 2019/0238886 A1    Aug. 1, 2019

(30) Foreign Application Priority Data

Oct. 25, 2016  (EP) .................................... 16306398

(51) Int. Cl.
*H04N 19/593* (2014.01)
*H04N 19/105* (2014.01)
(Continued)

(52) U.S. Cl.
CPC ........ *H04N 19/593* (2014.11); *H04N 19/105* (2014.11); *H04N 19/147* (2014.11); *H04N 19/186* (2014.11); *H04N 19/50* (2014.11)

(58) Field of Classification Search
None
See application file for complete search history.

(56) References Cited

U.S. PATENT DOCUMENTS 5,689,312 A    11/1997 Kim
7,339,632 B2    3/2008 Weitbruch et al.
(Continued)

FOREIGN PATENT DOCUMENTS

EP    2739058        6/2014
EP    2903275        8/2015
WO    WO2016115981    7/2016

OTHER PUBLICATIONS

Kim et al., Fast intra-mode decision in H.264 video coding using simple directional masks, Visual Communications and Image Processing, Beijing, Jul. 12, 2005.
(Continued)

*Primary Examiner* — Mohammed Jebari
(74) *Attorney, Agent, or Firm* — Robert D. Shedd

(57) ABSTRACT

A method and an apparatus for encoding a picture are disclosed. For at least one block of a picture to encode, a block predictor is determined (22) for a decoded first component (21) of said at least one block, from a reconstructed region of a first component of said picture. At least one second component of said at least one block is then encoded (23) by predicting said at least one second component from a second component of said block predictor. Corresponding decoding method and apparatus are disclosed.

11 Claims, 7 Drawing Sheets

Figure 1B:
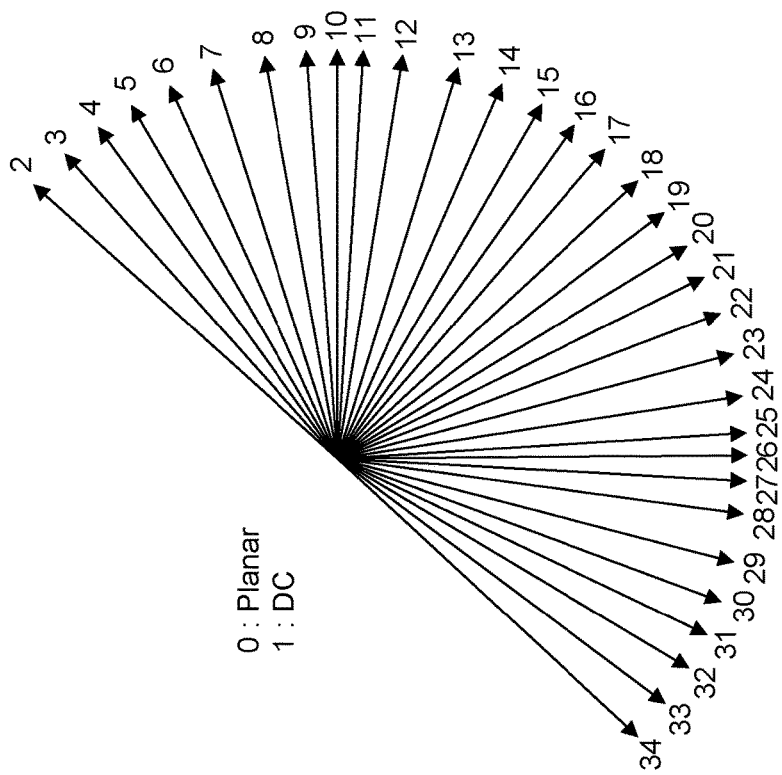

(51) Int. Cl.
H04N 19/147 (2014.01)
H04N 19/186 (2014.01)
H04N 19/50 (2014.01)

(56) References Cited

U.S. PATENT DOCUMENTS

| | | | |
|---|---|---|---|
| 2010/0246675 A1 | 9/2010 | Gharavi-Alkhansari et al. | |
| 2011/0243225 A1* | 10/2011 | Min | H04N 19/105 375/240.12 |
| 2012/0243614 A1* | 9/2012 | Hong | H04N 19/70 375/240.24 |
| 2012/0287995 A1* | 11/2012 | Budagavi | H04N 19/593 375/240.12 |
| 2012/0328013 A1* | 12/2012 | Budagavi | H04N 19/59 375/240.12 |
| 2013/0142260 A1* | 6/2013 | Wahadaniah | H04N 19/102 375/240.12 |
| 2013/0188705 A1* | 7/2013 | Liu | H04N 19/593 375/240.12 |
| 2014/0086502 A1* | 3/2014 | Guo | H04N 19/433 382/238 |
| 2014/0153642 A1* | 6/2014 | Hattori | H04N 19/159 375/240.03 |
| 2014/0355667 A1* | 12/2014 | Lei | H04N 19/167 375/240.02 |
| 2015/0036745 A1* | 2/2015 | Hsu | H04N 19/593 375/240.12 |
| 2015/0124865 A1* | 5/2015 | Kim | H04N 19/186 375/240.02 |
| 2017/0134734 A1* | 5/2017 | Wu | H04N 19/154 |
| 2017/0230687 A1* | 8/2017 | Chen | H04N 19/105 |

OTHER PUBLICATIONS

Ho et al., Single Step Optimal Block Matched Motion Estimation With Motion Vectors Having Arbitrary Pixel Precisions, American Journal of Engineering and Applied Sciences, vol. 4, No. 4, pp. 448-460, (2011).

Cherigui et al., Hybrid Template and Block Matching Algorithm for Image Intra Prediction, Proceedings of the 2012 IEEE International Conference on Acoustics, Speech and Signal Processing (ICASSP 2012), pp. 781-784.

Ho et al., Single Step Optimal Block Matched Motion Estimation With Motion Vectors Having Arbitrary Pixel Precisions, In Communcation Systems Networks and Digital Signal Processing (CSNDSP), 2010 7th International Symposium, Jul. 2010, pp. 316-326.

* cited by examiner

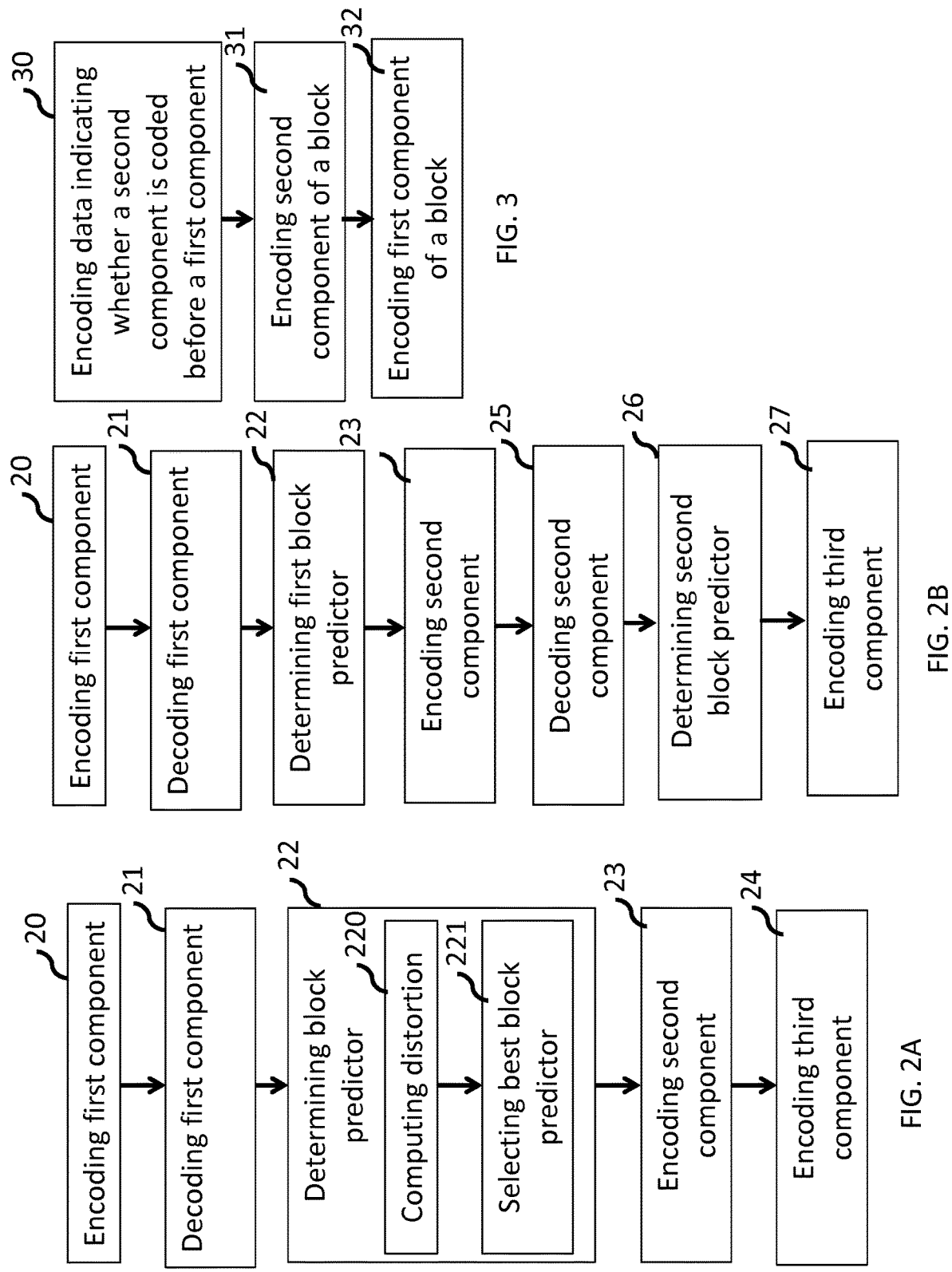

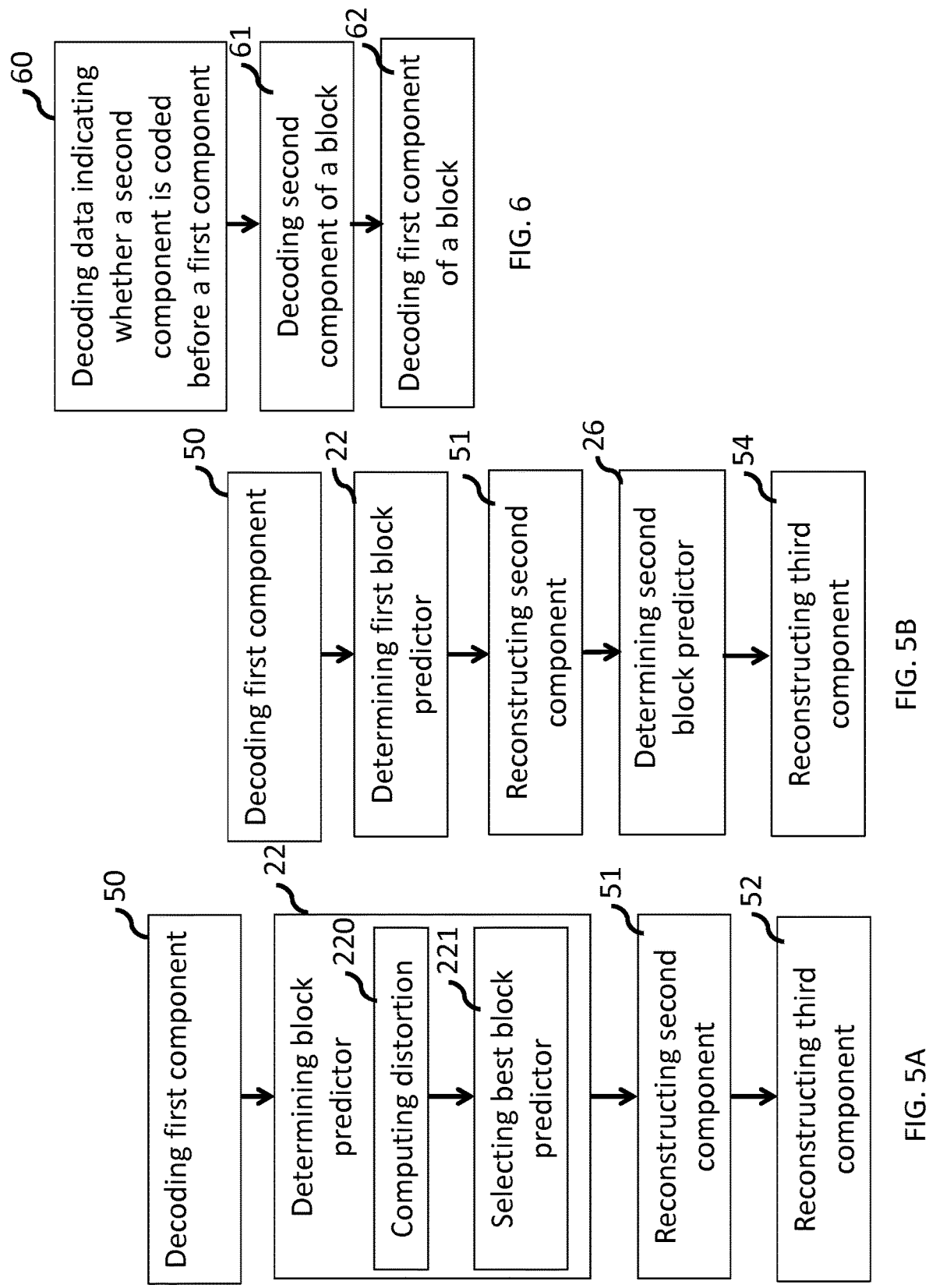

METHOD AND APPARATUS FOR ENCODING AND DECODING AT LEAST ONE BLOCK OF A PICTURE BASED ON COMPONENTS OF THE AT LEAST ONE BLOCK

1. TECHNICAL FIELD

A method and an apparatus for encoding a picture or a video into a bitstream are disclosed. Corresponding decoding method and apparatus are further disclosed.

2. BACKGROUND

To transmit digital images or video sequences over a network, the digital images or video sequences should be compressed for reducing the bandwidth needed for their transmission.

Video compression techniques usually propose to implement a pixel prediction of a current image with respect to other pixels in the same picture (intra prediction) or a previous or next image (inter prediction). To do this, the images are divided into blocks of pixels. The blocks are then predicted using information already reconstructed, corresponding to the blocks previously encoded/decoded in the current image according to the scanning order of the blocks in the image. The coding of a current block is performed using an intra or inter prediction of the current block, and a prediction residual or "residual block" corresponding to a difference between the current block and the predicted block is computed. The resulting residual block is then converted, for example by using a transform such as a DCT (discrete cosine transform) type transform. The coefficients of the transformed residual block are then quantized and encoded by entropy coding and transmitted to a decoder.

More particularly, intra prediction exploits spatial redundancies of the current image to encode. Known video compression standards, such as H.264/AVC or HEVC, use directional intra prediction modes using the pixels of causal neighbor blocks surrounding the current block to encode for building the prediction of the current block. The intra prediction modes for encoding the luminance component of a current block are illustrated for the H.264/AVC standard on FIG. 1A and for the HEVC standard on FIG. 1B.

Known video compression standards usually operate sequentially on the color components of the picture. For instance, when the video is in a YUV format, the luminance Y component of a current block is first encoded, then the chrominance components U and V are encoded.

According to the H.264/AVC standard, the chrominance components of the current block may be predicted by an intra prediction mode selected among a subset of the 9 intra prediction modes, i.e. the 9 intra prediction modes (of index m) are not all available for the chrominance components. According to the HEVC standard, the chrominance components of the current block may be predicted in a similar manner from an intra prediction mode selected among a subset of the 36 intra prediction modes (of index m) or using a same intra prediction mode as the one used for the luminance component.

A novel method and apparatus for encoding a picture are disclosed.

3. SUMMARY

According to a first aspect of the present disclosure, a method for encoding a picture is disclosed. Such an encoding method comprises, for at least one block of said picture:

determining a block predictor for a decoded first component of said block, from a reconstructed region of a first component of said picture, encoding at least one second component of said block by predicting said at least one second component from a second component of said block predictor.

According to another aspect of the present disclosure, an apparatus for encoding a picture is disclosed. Such an encoding apparatus comprises:

means for determining a block predictor for a decoded first component of said block, from a reconstructed region of a first component of said picture, means for encoding at least one second component of said block by predicting said at least one second component from a second component of said block predictor.

According to the present principle, a reconstructed first component of a current block is used for determining a prediction for another component of the current block. Therefore, the correlation between the color components of the current block is taken into account when encoding the current block. Furthermore, as a block predictor for the other component is determined according to the reconstructed first component, a same prediction can be performed at the decoder with no need to send signaling information, for instance the transmission of a motion vector or intra mode prediction is thus avoided. The present principle allows improving compression efficiency.

According to an embodiment of the present disclosure, determining a block predictor of said decoded first component comprises selecting said block predictor by minimizing a distortion measure between said decoded first component of said block and a first component of a block in the reconstructed region of the first component of said picture.

According to this embodiment, a best block matching predictor may be selected for the first component.

According to another embodiment of the present disclosure, said first component of the block is encoded using a spatial prediction.

According to another embodiment of the present disclosure, the encoding method further comprises or the encoding apparatus is configured for encoding at least one third component of said block by predicting said at least one third component from a third component of said block predictor.

According to another embodiment of the present disclosure, the encoding method further comprises or the encoding apparatus is configured for:

decoding said second component of said block, determining another block predictor by minimizing a difference between said decoded first component of said block and a first component of a block in the reconstructed region of the first component of said picture and a difference between said decoded second component of of said block and a second component of a block in a reconstructed region of a second component of said picture, encoding at least one third component of said block by predicting said at least one third component of said block from a third component of said another block predictor.

According to this embodiment, the previously encoded components of the current block may be used for determining a best predictor for a third component. Thus, compression efficiency is further improved.

According to another embodiment of the present disclosure, the encoding method further comprises or the encoding apparatus is configured for, for a block subsequent to said block:

encoding data, said data indicating that a second component of said subsequent block is encoded before a first component of said subsequent block, encoding said first component of said subsequent block by using a predictor block determined according to a reconstructed second component of said subsequent block.

According to this embodiment, it is possible for different blocks of a same picture, to change the component that is encoded first. For instance, in a case of a YUV picture format, it is possible for one block to first encode the Y component and then the U and V components, and for another block to first encode the U component and then the Y and V components.

According to another aspect of the present disclosure, a method for decoding a picture from a coded bitstream is disclosed. Such a decoding method comprises:

determining a block predictor for a decoded first component of a block of the picture, from a reconstructed region of a first component of said picture, decoding at least one second component of said block by predicting said at least one second component of said block from a second component of said block predictor.

According to another aspect of the present disclosure, an apparatus for decoding a picture from a coded bitstream is disclosed, such a decoding apparatus comprises:

means for determining a block predictor for a decoded first component of a block of the picture, from a reconstructed region of a first component of said picture, means for decoding at least one second component of said block by predicting said at least one second component of said block from a second component of said block predictor.

According to an embodiment of the present disclosure, determining a block predictor of said decoded first component comprises selecting said block predictor by minimizing a distortion measure between said decoded first component and a first component of a block in the reconstructed region of the first component of said picture.

According to another embodiment of the present disclosure, said first component of the block is decoded using a spatial prediction.

According to another embodiment of the present disclosure, the decoding method further comprises or the decoding apparatus is further configured for decoding at least one third component of said block by predicting said at least one third component of said block from a third component of said block predictor.

According to another embodiment of the present disclosure, the decoding method further comprises or the decoding apparatus is further configured for:

determining another block predictor by minimizing a difference between said reconstructed first component of said block and a first component of a block in the reconstructed region of the first component of said picture and a difference between said reconstructed second component of the block and a second component of a block in a reconstructed region of the second component of said picture, decoding at least one third component of said block by predicting said at least one third component of said block from a first component and a second component of said another block predictor.

According to another embodiment of the present disclosure, the decoding method further comprises or the decoding apparatus is further configured for, for a block subsequent to the current block:

decoding data from said bitstream, said data indicating that a second component of said subsequent block is encoded before a first component of said subsequent block, decoding said first component of said subsequent block by using a predictor block determined according to a decoded second component of said subsequent block.

According to another aspect of the present disclosure, a coded bitstream representative of a coded picture is disclosed. Such a coded bitstream comprises, for at least one block of said picture:

coded data representative of a first component of said block, coded data representative of a second component of said block, coded data indicating that said second component of said block is predicted by a second component of a block predictor, said block predictor being determined according to said first component of said block previously reconstructed.

According to an embodiment of the present disclosure, the coded bitstream further comprises, for at least a subsequent block of said block:

coded data indicating that a second component of said subsequent block is encoded before a first component of said subsequent block, coded data representative of said second component of said subsequent block, and coded data representative of said first component of said subsequent block, said first component being encoded using a prediction from a first component of a predictor block, said predictor block being determined according to the second component of said subsequent block previously reconstructed.

According to one implementation, the different steps of the method for encoding a picture or decoding a picture as described here above are implemented by one or more software programs or software module programs comprising software instructions intended for execution by a data processor of an apparatus for encoding/decoding a picture, these software instructions being designed to command the execution of the different steps of the methods according to the present principles.

A computer program is also disclosed that is capable of being executed by a computer or by a data processor, this program comprising instructions to command the execution of the steps of a method for encoding a picture or of the steps of a method for decoding a picture as mentioned here above.

This program can use any programming language whatsoever and be in the form of source code, object code or intermediate code between source code and object code, such as in a partially compiled form or any other desirable form whatsoever.

The information carrier can be any entity or apparatus whatsoever capable of storing the program. For example, the carrier can comprise a storage means such as a ROM, for example a CD ROM or a microelectronic circuit ROM or again a magnetic recording means, for example a floppy disk or a hard disk drive.

Again, the information carrier can be a transmissible carrier such as an electrical or optical signal, which can be conveyed via an electrical or optical cable, by radio or by other means. The program according to the present principles can be especially uploaded to an Internet type network.

As an alternative, the information carrier can be an integrated circuit into which the program is incorporated, the circuit being adapted to executing or to being used in the execution of the methods in question.

According to one embodiment, the methods/apparatus may be implemented by means of software and/or hardware components. In this respect, the term "module" or "unit" can correspond in this document equally well to a software component and to a hardware component or to a set of hardware and software components.

A software component corresponds to one or more computer programs, one or more sub-programs of a program or more generally to any element of a program or a piece of software capable of implementing a function or a set of functions as described here below for the module concerned. Such a software component is executed by a data processor of a physical entity (terminal, server, etc) and is capable of accessing hardware resources of this physical entity (memories, recording media, communications buses, input/output electronic boards, user interfaces, etc).

In the same way, a hardware component corresponds to any element of a hardware unit capable of implementing a function or a set of functions as described here below for the module concerned. It can be a programmable hardware component or a component with an integrated processor for the execution of software, for example an integrated circuit, a smartcard, a memory card, an electronic board for the execution of firmware, etc.

4. BRIEF DESCRIPTION OF THE DRAWINGS

Figure 1A:
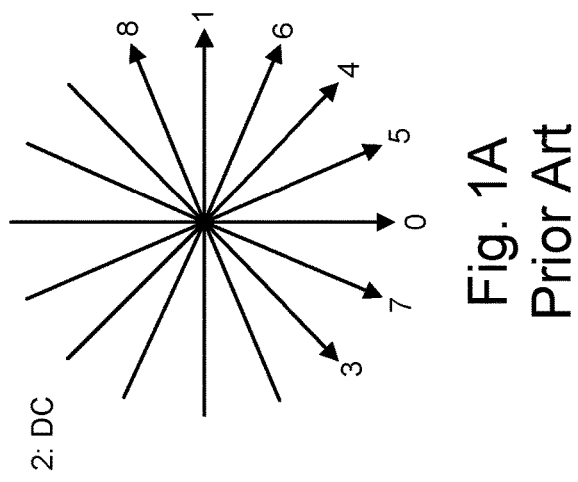
Figure 2C:
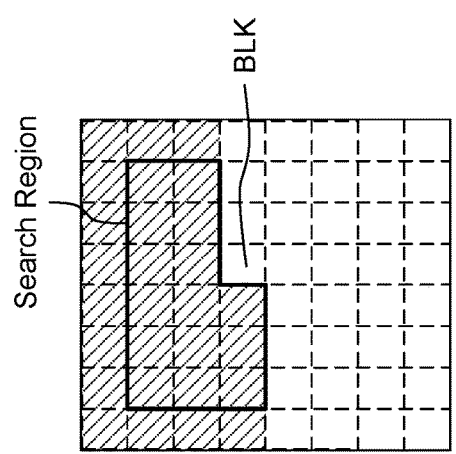
Figure 4:
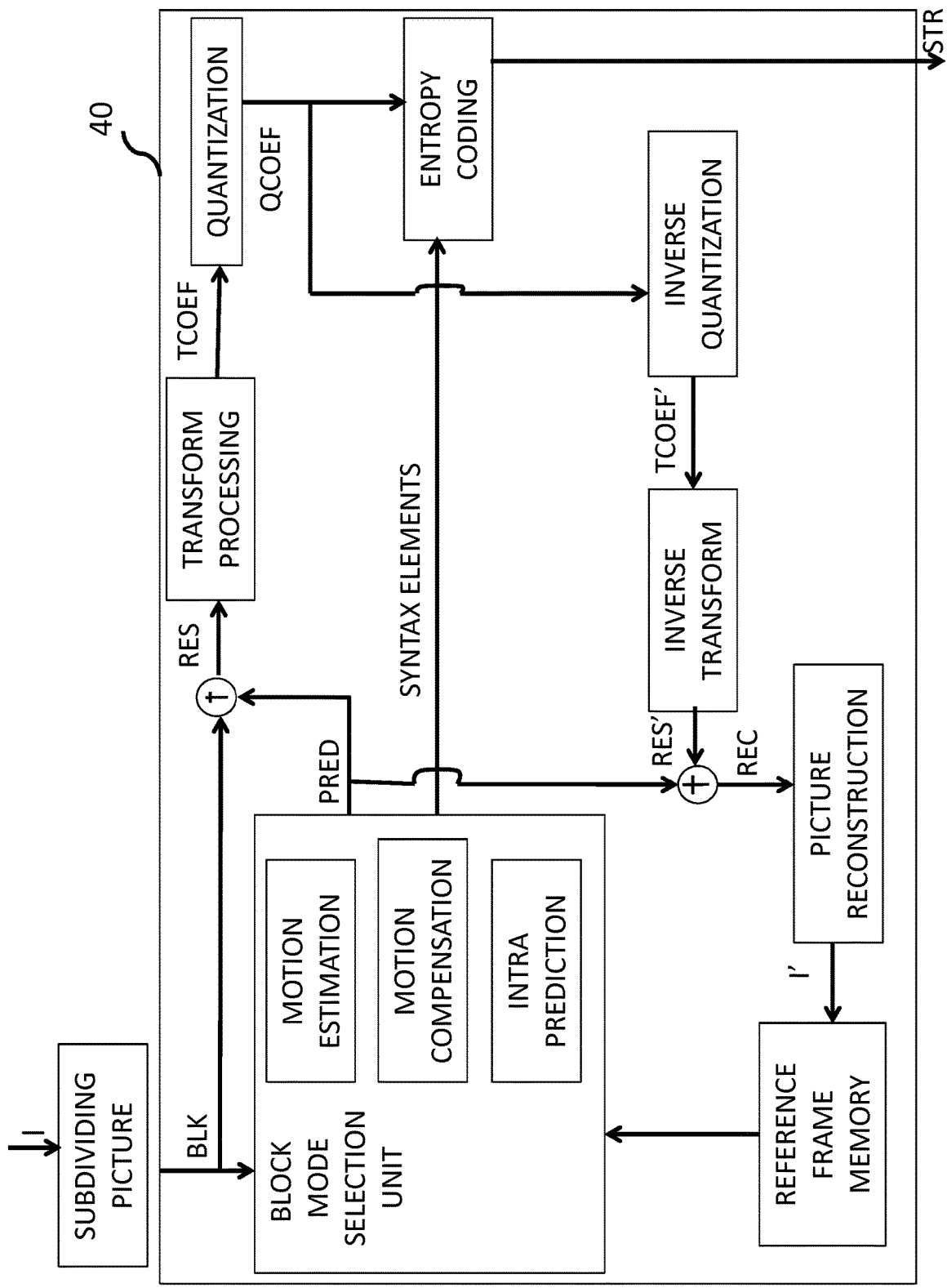
Figure 7:
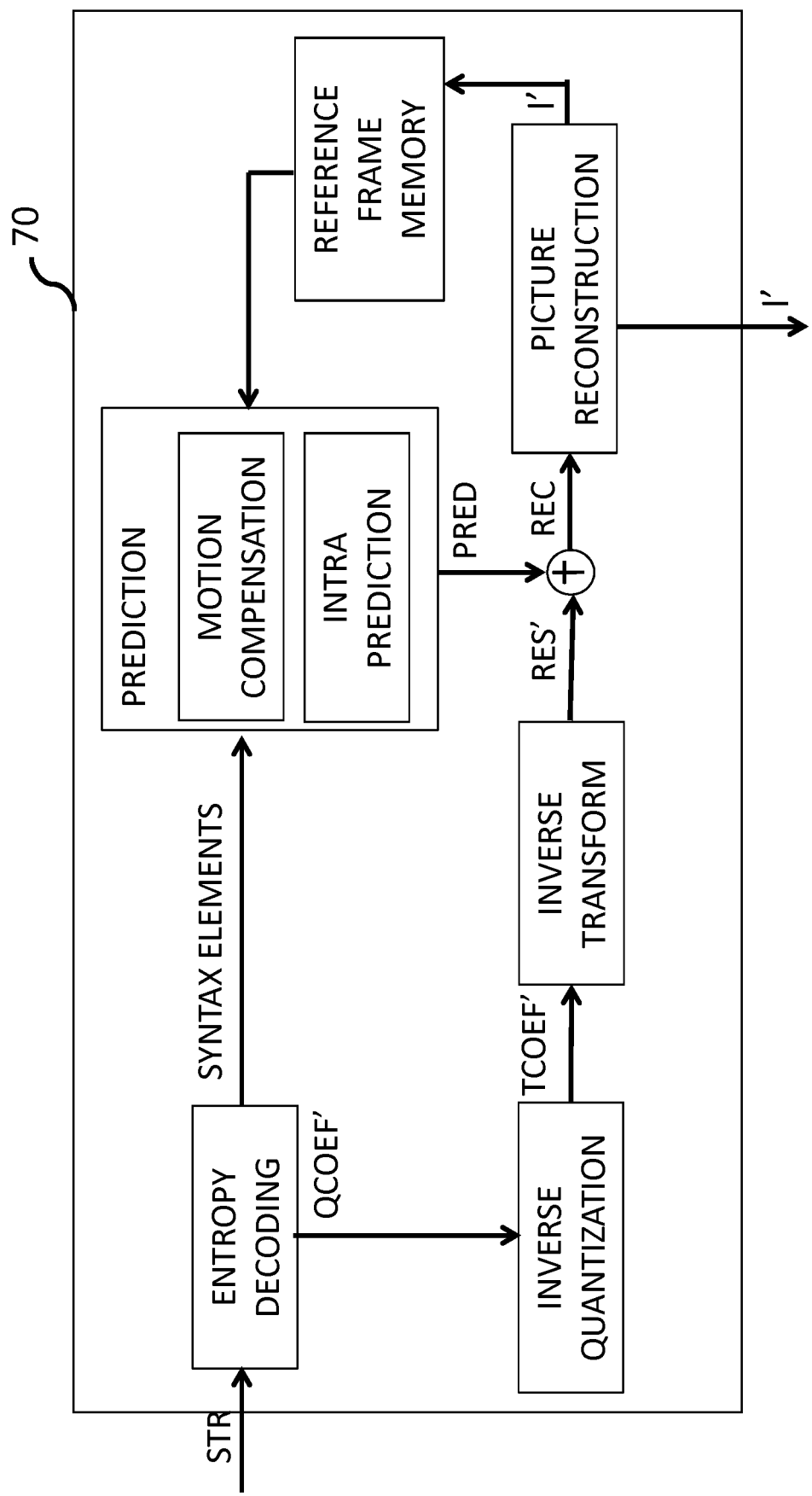
Figure 9:
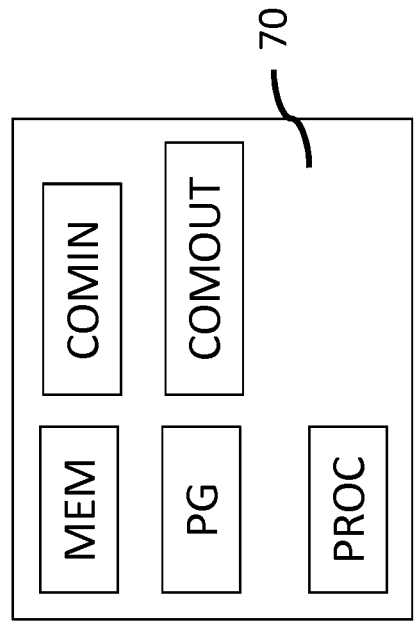
Figure 8:
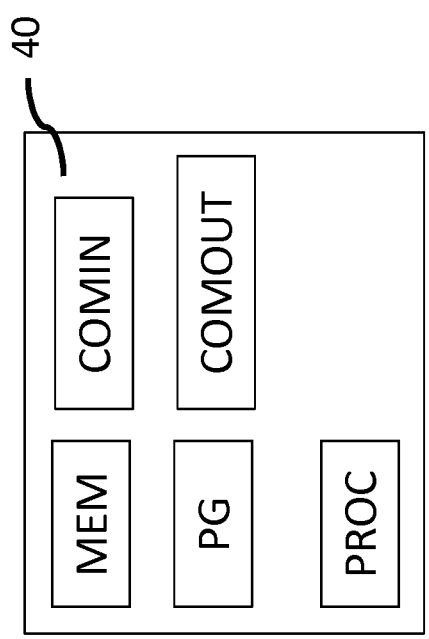
Figure 10:
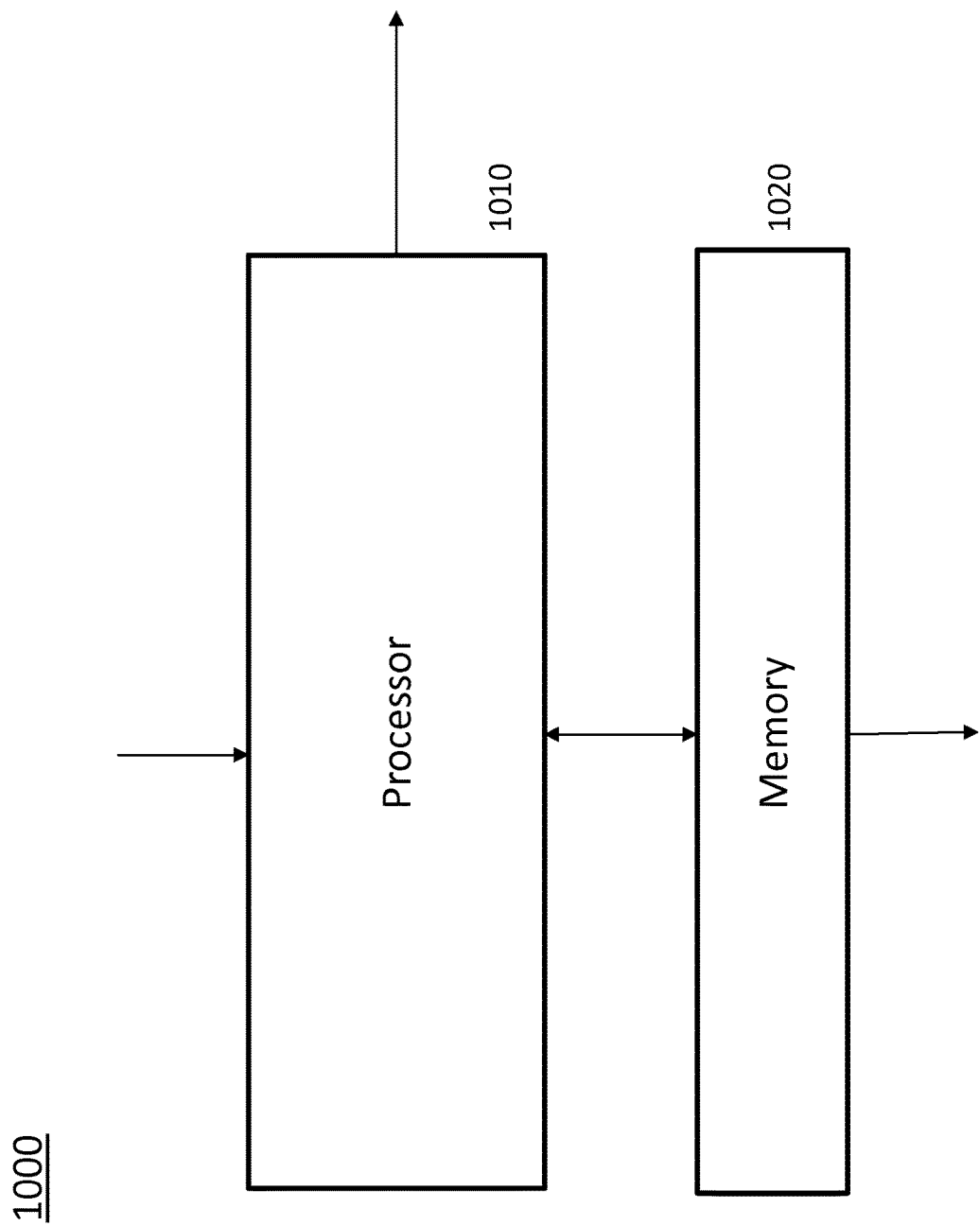

FIG. 1A illustrates intra prediction modes according to an H.264/AVC video compression standard, FIG. 1B illustrates intra prediction modes according to an HEVC video compression standard, FIG. 2A illustrates a flow diagram of an exemplary method for encoding a picture according to an embodiment of the present disclosure, FIG. 2B illustrates a flow diagram of an exemplary method for encoding a picture according to another embodiment of the present disclosure, FIG. 2C illustrates a current block to encode or decode and a corresponding search region, according to an embodiment of the present disclosure, FIG. 3 illustrates a flow diagram of an exemplary method for encoding a picture according to another embodiment of the present disclosure, FIG. 4 illustrates an exemplary encoder that may be used to implement any one of the embodiments disclosed herein, FIG. 5A illustrates a flow diagram of an exemplary method for decoding a picture according to an embodiment of the present disclosure, FIG. 5B illustrates a flow diagram of an exemplary method for decoding a picture according to another embodiment of the present disclosure, FIG. 6 illustrates a flow diagram of an exemplary method for decoding a picture according to another embodiment of the present disclosure, FIG. 7 illustrates an exemplary decoder that may be used to implement any one of the embodiments disclosed herein, FIG. 8 illustrates an exemplary structure of an encoder that may be used to implement any one of the embodiments disclosed herein, FIG. 9 illustrates an exemplary structure of a decoder that may be used to implement any one of the embodiments disclosed herein, FIG. 10 illustrates one embodiment of an encoder or decoder for encoding or decoding a picture from a coded bitstream.

5. DESCRIPTION OF EMBODIMENTS

It is to be understood that the figures and descriptions have been simplified to illustrate elements that are relevant for a clear understanding of the present principles, while eliminating, for purposes of clarity, many other elements found in typical encoding and/or decoding devices. It will be understood that, although the terms first and second may be used herein to describe various elements, these elements should not be limited by these terms. These terms are only used to distinguish one element from another. Various methods are described above, and each of the methods comprises one or more steps or actions for achieving the described method. Unless a specific order of steps or actions is required for proper operation of the method, the order and/or use of specific steps and/or actions may be modified or combined.

Generally, a "component" addresses a specific area in a sample array (e.g., luminance Y), and a "block" includes the collocated sample array of all encoded color components (Y, Cb, Cr, or monochrome, or Y, U, V, etc).

In the following sections, the word "reconstructed" and "decoded" can be used interchangeably. Usually but not necessarily "reconstructed" is used on the encoder side while "decoded" is used on the decoder side.

According to the present principle, a method for encoding and a method for decoding a picture are disclosed. The present principle could be applied to any kind of pictures, represented as 2D pictures, such as still picture coding or picture from a video sequence.

According to the present principle, a component of a current block to encode or to decode is encoded or decoded according to a previously reconstructed component of the current block.

The present principle is here described in the case where the pictures are represented in a YUV color space, wherein the Y component corresponds to the luminance data of the picture, the U and V components correspond to the chrominance data of the picture to encode or to decode. The present principle is applicable to other color spaces used for representing the picture, such as RGB, Luv, X, Y, Z, or any other representations . . . .

FIG. 2A illustrates a flow diagram of an exemplary method for encoding a picture according to an embodiment of the present disclosure. For encoding a picture, the picture is currently divided into blocks of pixels and each block is encoded according to an encoding scanning order. Below, encoding of a current block Blk(Y, U, V) of the picture is disclosed, wherein Y, U and V represent the components of the current block.

In step 20, luminance signal Y of the current block Blk(Y, U, V) of the picture is first encoded. For instance, the luminance signal is predicted using a block spatial prediction, using for instance an intra prediction mode from a video compression standard. For this, a best prediction mode is searched from the available intra prediction modes and a prediction block $Y_{pred}$ is built.

For a given block, the selection of a best intra prediction mode among N modes is for example based on minimization of a Lagrangian equation:

$$J(\text{Mode}|Qp,\lambda)=D(y,y',\text{Mode}|Qp)+\lambda \times R(y,y',\text{Mode}|Qp),$$

where
- $QP$ is the block quantizer, $\lambda$ is the Lagrangian multiplier for mode decision,
- here, D is the sum of the squared differences between the original block luminance signal y and its reconstruction y',
- R(s,c,Mode|Qp) represents the number of bits associated with choosing mode Mode. It includes the bits for the intra prediction mode and the DCT-coefficients for the luminance block.

Finally, the best intra prediction mode for which the rate distortion cost J is the smallest is selected.

Then, the difference $Y_{res}$ between the luminance block Y and the block prediction $Y_{pred}$ is computed and frequency transformed (for instance using a DCT, for Discrete Cosine Transform), quantized and encoded and then carried out.

In step 21, the luminance signal Y' for the current block is reconstructed. The luminance signal Y' of the current block Blk is rebuilt by adding the prediction block $Y_{pred}$ to the dequantized and inverse transformed prediction error block $Y'_{res}$.

In step 22, a block predictor is determined for the luminance signal Y of the current block Blk (Y,U, V) by searching in a search region a best block matching the rebuilt luminance block Y'.

FIG. 2C illustrates a current block to encode BLK and an associated search region, represented with thicker lines. The search region comprises previously reconstructed blocks of the picture according to a scan order of encoding (represented by hatched lines in FIG. 2C). A best match between the reconstructed block of luminance Y' and a block from the search region in the luminance space of the picture is searched.

For this, in step 220, the nearest block $Y'_{nst}$ to the block Y' is searched by computing for instance a Mean Square Error (MSE) between the pixels of the block Y' (whose pixels values are denoted $y'_0$ to $y'_{N-1}$) and the pixels of a block candidate $Y'_{cd}$ (whose pixels values are denoted with $y'_{cd,0}$ to $y'_{cd,N-1}$), with:

$$mse(Y', Y'_{cd}) = \sum_{i=0}^{N-1}(y'_i - y'_{cd,i})^2$$

Here, N equals to c×l, which correspond to the sizes in pixel (columns c, lines l) of the luminance blocks for the block matching.

In step 221, the candidate block $Y'_{cd}$ that provides the lowest MSE is selected as the best match of the block Y', as follows:

$$Y'_{nst} = \operatorname*{argmin}_{Y'_{cd}} MSE(Y', Y'_{cd}),$$

with $Y'_{cd}$ belonging to the search region.

The block $P(Y'_{nst}, U'_{pred}, V'_{pred})$ is thus selected as the best predictor block.

In step 23, the chrominance component U of the current block is then encoded using the chrominance component $U'_{pred}$ associated to the best predictor block $P(Y'_{nst}, U'_{pred}, V'_{pred})$. A difference $U_{res}$ between the original block U of the current block Blk(Y,U,V) and the block prediction $U'_{pred}$ is computed, then frequency transformed, quantized and encoded and then carried out.

According to an embodiment of the present disclosure, both chrominance components U and V are encoded using the best predictor block $P(Y'_{nst}, U'_{pred}, V'_{pred})$ determined at step 22. Thus, according to this embodiment, in step 24, the chrominance component V of the current block is then encoded using the chrominance component $V'_{pred}$ associated to the best predictor block $P(Y'_{nst}, U'_{pred}, V'_{pred})$. A difference $V_{res}$ between the original block V of the current block Blk(Y,U,V) and the block prediction $V'_{pred}$ is computed, then frequency transformed, quantized and encoded and then carried out.

According to another embodiment, for encoding the chrominance component V of the current block Blk(Y,U,V), a new best predictor block is searched. Such an embodiment is further disclosed below in relation with FIG. 2B.

In FIG. 2B, steps 20-23 are similar to steps 20-23 disclosed with FIG. 2A and are not explained further.

In step 25, the chrominance signal U' for the current block is reconstructed. The chrominance signal U' of the current block Blk is rebuilt by adding the prediction block $U'_{pred}$ to the dequantized and inverse transformed prediction error block $U'_{res}$.

In step 26, a second best predictor block is determined in a similar manner as in step 22, but by minimizing the error for the luminance signal Y' and for the chrominance signal U'. That is, the nearest block Q' is searched by minimizing the following equation:

$$mse(Y', Y'_{cd}, U', U'_{cd}) = \sum_{i=0}^{N-1}(y'_i - y'_{cd,i})^2 + \sum_{i=0}^{M-1}(u'_i - u'_{cd,i})^2,$$

where $y'_0$ to $y'_{N-1}$ represent the pixel values of the luminance block Y',
$u'_0$ to $u'_{N-1}$ represent the pixel values of the chrominance block U',
$y'_{cd,0}$ to $y'_{cd,N-1}$ represent the pixel values of the luminance block $Y'_{cd}$ of the candidate block,
$u'_{cd,0}$ to $u'_{cd,M-1}$ represent the pixel values of the chrominance block $U'_{cd}$ of the candidate block,
N equals to c×l, which correspond to the sizes in pixel (columns c, lines l) of the luminance blocks for the block matching,
M equals to cu×lu, which correspond to the sizes in pixel (columns cu, lines lu) of the chrominance blocks for the block matching.

The candidate block from the search region providing the minimum error $$\arg\min_{Y'_{cd}, U'_{cd}} MSE(Y', Y'_{cd}, U', U'_{cd})$$

is selected as the second best predictor block $Q(Y'_Q, U'_Q, V'_{pred})$.

In step 27, the chrominance component V of the current block is then encoded using the chrominance component $V'_{pred}$ associated to the second best predictor block $Q(Y'_Q, U'_Q, V'_{pred})$. The difference $V_{res}$ between the original block V of the current block Blk(Y,U,V) and the block prediction $V'_{pred}$ is computed, then frequency transformed, quantized and encoded and then carried out.

In the embodiments disclosed above, the luminance component of a current block is encoded first and chrominance components U and V are encoded using a predictor block determined according to the rebuilt luminance block of the current block. According to another embodiment, any components of the current block can be encoded first, for instance U, and the remaining components are encoded according to this component (Y, V).

According to this embodiment, as illustrated in FIG. 3, in step 30, data is encoded for signaling that a component, for instance U, is encoded before another component, for instance Y.

According to this embodiment, from one block to another block, the first component to encode may vary, for instance according to rate-distortion decisions.

According to this embodiment, the components are then encoded according to any one of the embodiments disclosed above in relation with FIGS. 2A and 2B.

For instance, in step 31, a chrominance component U is encoded in a similar way as in step 20. Then, in step 32, the luminance component Y is encoded by performing steps 21 to 23 disclosed in FIG. 2A.

FIG. 4 illustrates an exemplary encoder configured to implement any one of the embodiments of the method for encoding a picture disclosed above. The encoder 40 disclosed here below may be conforming to any video or still picture encoding schemes. The encoding and decoding processes described below are for illustration purposes. According to some embodiments, encoding or decoding modules may be added, or removed or may vary from the following modules. However, the principle disclosed herein could still be applied to these variants.

Classically, the encoder 40 may include several modules for block-based video encoding, as illustrated in FIG. 4. A picture I to be encoded is input to the encoder 40. The picture I is first subdivided into a set of blocks by a subdividing module. Each block BLK of the picture I is then processed for encoding.

The encoder 40 performs encoding of each block BLK of the picture I as follows. The encoder 40 comprises a mode selection unit for selecting a coding mode for a block BLK of the picture to be coded, e.g. based on a rate/distortion optimization. Such a mode selection unit comprising:
- a motion estimation module for estimating motion between one current block of the picture to be coded and reference pictures,
- a motion compensation module for predicting the current block using the estimated motion,
- an intra prediction module for spatially predicting the current block.

In case of an intra prediction mode, the intra prediction module is configured to implement the method for encoding according to any one of the embodiments disclosed above.

For instance, a best intra prediction mode is selected, based on a rate-distortion optimization, for encoding a first component of the current block BLK. The intra prediction module then encodes a second and a third component of the current block BLK according to any one of the embodiments disclosed in reference with FIG. 2A or 2B, by using a prediction determined using at least the first component of the current block BLK.

Such encoding of the second and third components can be performed in competition with classical intra prediction coding modes available for these components, and the coding mode performing best in a rate-distortion sense is thus selected for encoding the second and the third components of the current block.

Once a coding mode is selected for each component of the current block BLK, the mode selection unit delivers for the current block BLK, a predicted block PRED(Y,U,V) and corresponding syntax elements to be coded in the bitstream for performing the same block prediction at a decoder. Each component of the predicted block PRED(Y,U,V) correspond to a prediction sample array computed according to the coding mode determined for the component. In case wherein the coding mode selected for a component of the current block BLK is a coding mode corresponding to the method for encoding disclosed above, additional syntax element may be encoded in the bitstream for signaling this coding mode to the decoder.

A residual block RES(Y,U,V) is then obtained by subtracting the predicted block PRED(Y,U,V) from the original samples of the block BLK. Each component of the residual block RES(Y,U,V) is then transformed by a transform processing module delivering transform block TCOEF(Y,U,V) of transformed coefficients. Transformed coefficients are then quantized by a quantization module delivering quantized transform residual coefficients QCOEF.

The syntax elements and quantized residual transform coefficients QCOEF are then input to an entropy coding module to deliver coded data to form the coded bitstream STR.

The quantized residual transform coefficients QCOEF are processed by an inverse quantization module delivering a block TCOEF'(Y,U,V) of dequantized transform coefficients. The block TCOEF'(Y,U,V) is passed to an inverse transform module for reconstructing a block of residual prediction RES'(Y,U,V).

A reconstructed version REC(Y,U,V) of the block BLK (Y,U,V) is then obtained by adding the prediction block PRED(Y,U,V) to the reconstructed residual prediction block RES'(Y,U,V).

The reconstructed block REC(Y,U,V) is stored in memory for use by a picture reconstruction module. The picture reconstruction module performs reconstruction of a decoded version I' of the picture I from the reconstructed blocks REC(Y,U,V). The reconstructed picture I' is then stored in a reference picture memory for later use as a reference picture for encoding the following pictures of the set of pictures to code or for encoding subsequent blocks of the picture I.

FIG. 5A illustrates a flow diagram of an exemplary method for decoding a picture according to an embodiment of the present disclosure. For decoding a picture, the picture is currently divided into blocks of pixels and each block is decoded independently from a compressed bitstream. Below, decoding of a current block Blk(Y, U, V) of the picture is disclosed, wherein Y, U and V represent the components of the current block.

In step 50, luminance signal Y' of the current block Blk(Y, U, V) of the picture is first decoded. For this, the prediction block $Y_{pred}$ is built. For instance, a syntax element in the bitstream signaled that the luminance signal Y of the current block Blk is coded according to an intra mode prediction m. The prediction block $Y_{pred}$ is thus built by performing the intra mode prediction m. The residual coefficients for the luminance signal Y of the block Blk ($r_{eq}$) are then decoded from the bitstream, and dequantized and inverse transformed to form a residual error prediction block ($Y'_{res}$). The residual error prediction ($Y'_{res}$) is added to the prediction block $Y_{pred}$ giving the reconstructed luminance block Y'.

Step 22 is performed in a similar way as step 22 disclosed with FIG. 2A. At the end of step 22, a best predictor block $P(Y'_{nst}, U'_{pred}, V'_{pred})$ is found based on a block-matching search performed for the decoded luminance block Y' in the same search region as in the encoding stage.

In step 51, the chrominance component U' of the current block is then decoded using the chrominance component $U'_{pred}$ associated to the best predictor block $P(Y'_{nst}, U'_{pred}, V'_{pred})$.

The residual coefficients for the chrominance signal U of the block Blk are decoded from the bitstream, dequantized and inverse transformed to form a residual error prediction block ($U'_{res}$). The residual error prediction ($U'_{res}$) is added to the prediction block $U'_{pred}$ giving the decoded chrominance block U'.

According to an embodiment of the present disclosure, both chrominance components U and V are predicted using the best predictor block $P(Y'_{nst}, U'_{pred}, V'_{pred})$ determined at step 22. Thus, according to this embodiment, in step 52, the chrominance component V of the current block is then decoded using the chrominance component $V'_{pred}$ associated to the best predictor block $P(Y'_{nst}, U'_{pred}, V'_{pred})$. The residual coefficients for the chrominance signal V of the block Blk are decoded from the bitstream, dequantized and inverse transformed to form a residual error prediction block ($V'_{res}$). The residual error prediction ($V'_{res}$) is added to the prediction block $V'_{pred}$ giving the decoded chrominance block VI.

According to another embodiment, the chrominance component V of the current block Blk(Y,U,V) is predicted from a new best predictor block determined according to the decoded luminance component Y' and to the decoded chrominance component U'. Such an embodiment is further disclosed below in relation with FIG. 5B.

In FIG. 5B, steps 50-51 and 22 are similar to steps 50-51 and 22 disclosed with FIGS. 5A and 2A and are not explained further.

In step 26, a second best predictor block is determined in a similar manner as in step 26 disclosed in FIG. 2B and is not described further here. At the end of step 26, a best predictor block $Q(Y'_Q, U'_Q, V'_{pred})$ is found based on a block-matching search performed for the decoded luminance block Y' and the decoded chrominance block U' in the same search region as in the encoding stage.

In step 54, the chrominance component V of the current block is then decoded using the chrominance component $V'_{pred}$ associated to the second best predictor block $Q(Y'_Q, U'_Q, V'_{pred})$. The residual coefficients for the chrominance signal V of the block Blk are decoded from the bitstream, dequantized and inverse transformed to form a residual error prediction block ($V'_{res}$). The residual error prediction ($V'_{res}$) is added to the prediction block $V'_{pred}$ giving the decoded chrominance block V'.

In the embodiments disclosed above, the luminance component of a current block is decoded first and chrominance components U and V are decoded using a predictor block determined according to at least the decoded luminance block of the current block. According to another embodiment, any components of the current block can be decoded first, as long as such component has been encoded first into the compressed bitstream. For instance, the luminance component Y can be decoded according to the chrominance component U. According to this embodiment, as illustrated in FIG. 6, in step 60, data signaling that a component, for instance U, of a given block is encoded before another component, for instance Y, is decoded from the compressed bitstream.

According to this embodiment, the components are then decoded according to any one of the embodiments disclosed above in relation with FIGS. 5A and 5B.

For instance, in step 61, a chrominance component U' is decoded in a similar way as in step 50. Then, in step 62, the luminance component Y' is decoded by performing steps 22, and 51 disclosed in FIG. 2A.

FIG. 7 illustrates an exemplary decoder configured to implement any one of the embodiments of the method for decoding a picture disclosed above.

A bitstream representative of a coded image or video comprises coded data representative of at least one block of said image or video, wherein said block has been coded according to an embodiment of the present principles.

The coded data is passed to the video decoding modules of the video decoder 70. As illustrated in FIG. 7, coded data is passed to an entropy decoding module that performs entropy decoding and delivers quantized coefficients QCOEF' to an inverse quantization module and syntax elements to a prediction module.

For each color component of the current block to decode, the quantized coefficients QCOEF' are inverse quantized by the inverse quantization module and inverse transformed by an inverse transform module delivering residual blocks data RES'.

Syntax elements specifying coding modes for the block are decoded from the bitstream and for coding each color component Y, U, V of the current block, the prediction module builds a prediction block PRED. The prediction module is configured for performing the prediction of a component of the block according to any one of the embodiments disclosed above. More particularly, the prediction module is configured to perform block-matching search of best block predictor for a previously decoded component of the current block to decode (steps 22, 26 disclosed in FIGS. 2A and 2B).

A reconstructed picture I' is obtained by adding prediction blocks PRED and residual blocks RES' for each color component of the current block. The reconstructed picture I' is stored in a reference frame memory for later use as reference frame. The reconstructed picture I' is then outputted by the video decoder 70.

The decoder 70 may be implemented as hardware or software or a combination of hardware and software thereof.

FIG. 8 illustrates the simplified structure of an apparatus (40) for encoding a picture according to an embodiment of the present principle. Such an apparatus 40 is configured to implement the method for encoding a picture according to the present principle according to any embodiments disclosed above. The functional units of the encoder apparatus 40 have been disclosed in reference to FIG. 4. The structural apparatus 40 disclosed below may be configured to implement each of these functional units individually or in combination, and according to any one of the embodiments of the principle disclosed above in reference with FIG. 2A, 2B or 3.

According to an embodiment, the encoder apparatus 40 comprises a processing unit PROC equipped for example with a processor and driven by a computer program PG stored in a memory MEM and implementing the method for encoding a picture according to the present principle.

At initialization, the code instructions of the computer program PG are for example loaded into a RAM (not shown) and then executed by the processor of the processing unit PROC. The processor of the processing unit PROC implements the steps of the method for encoding a picture which has been described here above, according to the instructions of the computer program PG.

The encoder apparatus 40 comprises a communication unit COMOUT to transmit an encoded bitstream STR to a data network.

The encoder apparatus 40 also comprises an interface COMIN for receiving a picture or a video to encode.

FIG. 9 illustrates an exemplary decoder that may be used in one embodiment of the present principles. Such an apparatus for decoding a picture is configured to implement the method for decoding a picture according to the present principles. The decoder apparatus of FIG. 9 may be as an example the decoder 70 as described in FIG. 7.

In the example shown in FIG. 9, the decoder apparatus comprises a processing unit PROC equipped for example with a processor and driven by a computer program PG stored in a memory MEM and implementing the method for decoding a picture according to the present principles.

At initialization, the code instructions of the computer program PG are for example loaded into a RAM (not shown) and then executed by the processor of the processing unit PROC. The processor of the processing unit PROC implements the steps of the method for decoding a picture which has been described here above, according to the instructions of the computer program PG.

Optionally, the decoder apparatus 70 comprises a communications unit COM to receive an encoded bitstream from an encoder.

The decoder apparatus 70 also comprises an interface for displaying a reconstructed picture or a reconstructed video.

One embodiment of an apparatus 1000 for encoding or decoding a picture from a coded bitstream using the present principles is illustrated in FIG. 10. The apparatus is comprised of Processor 1010 interconnected to Memory 1020. Instructions in Memory 1020 cause Processor 1010 to execute instructions to implement the method of either FIG. 2, 3, 5 or FIG. 6 on digital video image data or coded digital video image data, which may be input on one of the input ports of Processor 1010 or stored in Memory 1020.

The invention claimed is:

1. A method for encoding a picture comprising, for at least one block of said picture:
    encoding a first component of the at least one block based on spatial prediction and a prediction block;
    reconstructing the first component using the prediction block to form a decoded first component of the at least one block;
    determining a block predictor for the decoded first component of said at least one block based on a block matching of the decoded first component of the at least one block to a second block within a reconstructed region of a first component of said picture,
    encoding at least one second component of said at least one block by predicting said at least one second component from a second component of said block predictor, and wherein said first component of said picture to encode varies on a block basis based on a rate distortion decision, wherein the first component and the second component are components of color spaces, and
    wherein determining a block predictor of the decoded first component of the at least one block comprises:
    selecting the block predictor by evaluating a distortion measure between the decoded first component of the at least one block and a first component of the second block in the reconstructed region of the first component of the picture.

2. An apparatus for encoding a picture comprising;
    a memory, and
    a processor, configured to, for at least one block of said picture
    encode a first component of the at least one block based on spatial prediction and a prediction block;
    reconstruct the first component using the prediction block to form a decoded first component of the at least one block;
    determine a block predictor for the decoded first component of said at least one block, based on a block matching of the decoded first component of the at least one block to a second block within a reconstructed region of a first component of said picture, and
    encode at least one second component of said at least one block by predicting said at least one second component from a second component of said block predictor, and wherein said first component of said picture to encode varies on a block basis based on a rate distortion decision, wherein the first component and the second component are components of color spaces, and
    wherein the processor being configured to determine the block predictor of sad decoded first component comprises the processor being configured to:
    select said block predictor by evaluating a distortion measure between said decoded first component of said at least one block and a first component of the second block in the reconstructed region of the first component of said picture.

3. The method according to claim 1 further comprising:
    encoding at least one third component of said at least one block by predicting said at least one third component from a third component of said block predictor, wherein the third component is a component of color spaces.

4. The method according to claim 1 further comprising:
    decoding said second component of said block,
    determining another block predictor by minimizing a difference between said decoded first component of said at least one block and a first component of the second block in the reconstructed region of the first component of said picture and a difference between said decoded second component of said at least one block and a second component of a block in a reconstructed region of a second component of said picture,
    encoding at least one third component of said at least one block by predicting said at least one third component of said at least one block from a third component of said another block predictor, wherein the third component is a component of color spaces.

5. The method according to claim 1 further comprising for a block subsequent to said at least one block:
    encoding data, said data indicating that a second component of said subsequent block is encoded before a first component of said subsequent block,
    encoding said first component of said subsequent block by using a predictor block determined according to a reconstructed second component of said subsequent block.

6. A method for decoding a picture from a coded bitstream comprising:
    decoding a first component of at least one block of the picture based on spatial prediction and a prediction bock to form a decoded first component of the at least one block;
    determining a block predictor for the decoded first component of the at least one block of the picture, based on a block matching of the decoded first component of the at least one block to a second block within a reconstructed region of a first component of said picture,
    decoding at least one second component of said at least one block by predicting said at least one second component of said at least one block from a second component of said block predictor, and wherein said first component of said picture to decode varies on a block basis, wherein the first component and the second component are components of color spaces, and wherein determining a block predictor of the decoded first component of the at least one block comprises:

selecting the block predictor by evaluating a distortion measure between the decoded first component of the at least one block and a first component of the second block in the reconstructed region of the first component of the picture.

7. An apparatus for decoding a picture from a coded bitstream comprising:

a memory, and a processor, configured to;

decode a first component of at least one block of the picture based on spatial prediction and a prediction block to form a decoded first component of the at least one block;

determine a block predictor for the decoded first component of the at least one block of the picture, based on a block matching of the decoded first component of the at least one block to a second block within a reconstructed region of a first component of said picture, and decode at least one second component of said at least one block by predicting said at least one second component of said at least one block from a second component of said block predictor, and wherein said first component of said picture to decode varies on a block basis, wherein the first component and the second component are components of color spaces. and wherein the processor being configured to determine the block predictor comprises the processor being further configured to:

select the block predictor by evaluating a distortion measure between the decoded first component of the at least one block and a first component of the second block in the reconstructed region of the first component of the picture.

8. The method according to claim 6 further comprising:

decoding at least one third component of said at least one block by predicting said at least one third component of said at least one block from a third component of said block predictor, wherein the third component is a component of color spaces.

9. The method according to claim 6 further comprising:

determining another block predictor by minimizing a difference between said reconstructed first component of said at least one block and a first component of the second block in the reconstructed region of the first component of said picture and a difference between said reconstructed second component of the at least one block and a second component of a block in a reconstructed region of the second component of said picture, decoding at least one third component of said at least one block by predicting said at least one third component of said at least one block from a first component and a second component of said another block predictor, wherein the third component is a component of color spaces.

10. The method according to claim 6 further comprising, for a block subsequent to the at least one block:

decoding data from said bitstream, said data indicating that a second component of said subsequent block is encoded before a first component of said subsequent block, decoding said first component of said subsequent block by using a predictor block determined according to a decoded second component of said subsequent block.

11. A non-transitory computer readable medium storing executable program instructions to cause a computer executing the instructions to perform a method according to claim 1.

* * * * *